United States Patent
Garbar et al.

(10) Patent No.: US 11,592,701 B2
(45) Date of Patent: *Feb. 28, 2023

(54) BACKLIGHT UNIT WITH EMISSION MODIFICATION

(71) Applicant: Eyesafe Inc., Eden Prairie, MN (US)

(72) Inventors: Arkady Garbar, Lakeville, MN (US); Derek Harris, Saint Paul, MN (US); Kelly Mitzel, Eden Prairie, MN (US)

(73) Assignee: EYESAFE INC., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/348,570

(22) Filed: Jun. 15, 2021

(65) Prior Publication Data

US 2021/0311354 A1  Oct. 7, 2021

Related U.S. Application Data (63) Continuation-in-part of application No. 17/177,920, filed on Feb. 17, 2021, now Pat. No. 11,126,033, (Continued)

(51) Int. Cl.
  *G02F 1/1335* (2006.01)
  *G02B 1/04* (2006.01)
  (Continued)

(52) U.S. Cl.
  CPC ......... *G02F 1/133514* (2013.01); *G02B 1/04* (2013.01); *G02B 5/003* (2013.01);
  (Continued)

(58) Field of Classification Search
  CPC ..... G02B 5/22; G02B 5/003; G02F 1/133514; G02F 1/133614
  See application file for complete search history.

(56) References Cited

U.S. PATENT DOCUMENTS

| 2,403,685 A | 7/1946 | Sachtleben et al. |
|---|---|---|
| 2,493,200 A | 1/1950 | Land |

(Continued)

FOREIGN PATENT DOCUMENTS

| CA | 2924278 A | 6/2008 |
|---|---|---|
| CN | 1545702 A | 11/2004 |

(Continued)

OTHER PUBLICATIONS

Non-Final Office Action for U.S. Appl. No. 14/719,604; dated Aug. 30, 2017; date of filing: May 22, 2015; 59 pp.
(Continued)

*Primary Examiner* — Jessica M Merlin
(74) *Attorney, Agent, or Firm* — Grumbles Law PLLC; Brittany Nanzig (57) ABSTRACT

A display system and method are disclosed that includes an electronic display device and a backlight comprising a light-emitting array, a reflector adjacent to the light-emitting array, a diffuser opposite the reflector, a first brightness enhancing layer adjacent the diffuser, and an optical film in the backlight unit that includes at least one light conversion material or at least one light conversion material. The light conversion material is structured and configured to reduce hazardous blue light emissions between about 400 nm to about 500 nm. The disclosed display device can include a liquid crystal panel configured to control transmission of light from the backlight to a viewer. The display device also includes one or more optical films that incorporate one or more light conversion or light absorbing materials. The optical films can be positioned between the layers of the disclosed display device and give enhanced blue-light absorption to the display device.

24 Claims, 4 Drawing Sheets

Related U.S. Application Data which is a continuation-in-part of application No. PCT/US2020/059308, filed on Nov. 6, 2020, which is a continuation of application No. 16/695,983, filed on Nov. 26, 2019, now Pat. No. 10,955,697, said application No. 17/177,920 is a continuation-in-part of application No. 16/695,983, filed on Nov. 26, 2019, now Pat. No. 10,955,697.

(60) Provisional application No. 62/772,513, filed on Nov. 28, 2018.

(51) Int. Cl.

| | | |
|---|---|---|
| *G02B 5/00* | (2006.01) | |
| *G02F 1/13357* | (2006.01) | |
| *F21V 8/00* | (2006.01) | |
| *G02B 5/20* | (2006.01) | |
| *H05B 47/11* | (2020.01) | |
| *G02B 5/22* | (2006.01) | |

(52) U.S. Cl.
CPC ............ *G02B 5/208* (2013.01); *G02B 5/22* (2013.01); *G02B 6/0051* (2013.01); *G02F 1/133536* (2013.01); *G02F 1/133603* (2013.01); *H05B 47/11* (2020.01); *G02F 1/133607* (2021.01); *G02F 1/133614* (2021.01); *G02F 2201/086* (2013.01)

(56) References Cited

U.S. PATENT DOCUMENTS

| | | |
|---|---|---|
| 3,382,183 A | 5/1968 | Donoian et al. |
| 3,482,915 A | 12/1969 | Ferrand |
| 3,687,863 A | 8/1972 | Paul |
| 4,618,216 A | 10/1986 | Suzawa |
| 4,842,781 A | 6/1989 | Nishizawa et al. |
| 4,878,748 A | 11/1989 | Johansen et al. |
| 4,966,441 A | 10/1990 | Conner |
| 4,989,953 A | 2/1991 | Kirschner |
| 5,083,252 A | 1/1992 | McGuire |
| 5,177,509 A | 1/1993 | Johansen et al. |
| 5,446,569 A | 8/1995 | Iwai et al. |
| 5,483,464 A | 1/1996 | Song |
| 5,555,492 A | 9/1996 | Feger |
| 5,745,391 A | 4/1998 | Topor |
| 5,952,096 A | 9/1999 | Yamashita et al. |
| 6,019,476 A | 2/2000 | Kirschner |
| 6,229,252 B1 | 5/2001 | Teng et al. |
| 6,663,978 B1 | 12/2003 | Olson et al. |
| 6,778,238 B2 | 8/2004 | Moon et al. |
| 6,824,712 B1 | 11/2004 | Yang et al. |
| 6,826,001 B2 | 11/2004 | Funakura et al. |
| 6,846,579 B2 | 1/2005 | Anderson et al. |
| 6,955,430 B2 | 10/2005 | Pratt |
| 6,984,038 B2 | 1/2006 | Ishak |
| 6,991,849 B2 | 1/2006 | Oya |
| 7,014,336 B1 | 3/2006 | Ducharme et al. |
| 7,019,331 B2 | 3/2006 | Winters et al. |
| 7,019,799 B2 | 3/2006 | Utsumi et al. |
| 7,019,903 B2 | 3/2006 | Berger et al. |
| 7,029,118 B2 | 4/2006 | Ishak |
| 7,045,944 B2 | 5/2006 | Ushifusa et al. |
| 7,066,596 B2 | 6/2006 | Ishak |
| 7,071,602 B2 | 7/2006 | Terui et al. |
| 7,126,589 B2 | 10/2006 | Sung |
| 7,158,300 B2 | 1/2007 | Shimoda |
| 7,193,779 B2 | 3/2007 | Kim et al. |
| 7,218,044 B2 | 5/2007 | Kim et al. |
| 7,258,923 B2 | 8/2007 | van den Bogerd et al. |
| 7,491,440 B2 | 2/2009 | Fukatani et al. |
| 7,520,608 B2 | 4/2009 | Ishak et al. |
| 7,524,060 B2 | 4/2009 | Sanchez Ramos |
| 7,556,376 B2 | 7/2009 | Ishak et al. |
| 7,572,028 B2 | 8/2009 | Mueller et al. |
| 7,579,769 B2 | 8/2009 | Wu et al. |
| 7,630,128 B2 | 12/2009 | Krieg-Kowald |
| 7,695,180 B2 | 4/2010 | Schardt et al. |
| 7,703,917 B2 | 4/2010 | Sanchez Ramos |
| 7,710,511 B2 | 5/2010 | Gehlsen et al. |
| 7,731,791 B2 | 6/2010 | Deno et al. |
| 7,755,276 B2 | 7/2010 | Wang et al. |
| 7,785,501 B2 | 8/2010 | Segawa et al. |
| 7,825,578 B2 | 11/2010 | Takashima et al. |
| 7,832,903 B2 | 11/2010 | Sanchez Ramos |
| 7,914,177 B2 | 3/2011 | Sanchez Ramos |
| 8,034,206 B2 | 10/2011 | Kim et al. |
| 8,044,942 B1 | 10/2011 | Leonhard et al. |
| 8,063,999 B2 | 11/2011 | Jabri et al. |
| 8,075,133 B2 | 12/2011 | Sanchez Ramos |
| 8,075,145 B2 | 12/2011 | Engblom et al. |
| 8,113,651 B2 | 2/2012 | Blum et al. |
| 8,164,844 B2 | 4/2012 | Toda et al. |
| 8,303,859 B2 | 11/2012 | Koo et al. |
| 8,323,357 B2 | 12/2012 | Feldhues et al. |
| 8,360,574 B2 | 1/2013 | Ishak et al. |
| 8,403,478 B2 | 3/2013 | Ishak |
| 8,487,331 B2 | 7/2013 | Jang et al. |
| 8,498,042 B2 | 7/2013 | Danner et al. |
| 8,500,274 B2 | 8/2013 | Ishak |
| 8,506,114 B2 | 8/2013 | Van De Ven |
| 8,507,840 B2 | 8/2013 | Yu et al. |
| 8,518,498 B2 | 8/2013 | Song et al. |
| 8,547,504 B2 | 10/2013 | Guo et al. |
| 8,570,648 B2 | 10/2013 | Sánchez Ramos |
| 8,599,542 B1 | 12/2013 | Healey et al. |
| 8,657,455 B2 | 2/2014 | Yagi et al. |
| 8,659,724 B2 | 2/2014 | Hagiwara et al. |
| 8,680,406 B2 | 3/2014 | Chua |
| 8,680,492 B2 | 3/2014 | Ren et al. |
| 8,716,729 B2 | 5/2014 | Wiesmann et al. |
| 8,759,540 B2 | 6/2014 | Maeda et al. |
| 8,767,282 B2 | 7/2014 | Hashimura et al. |
| 8,770,749 B2 | 7/2014 | McCabe et al. |
| 8,817,207 B2 | 8/2014 | Rho et al. |
| 8,836,209 B2 | 9/2014 | Baek et al. |
| 8,882,267 B2 | 11/2014 | Ishak et al. |
| 8,928,220 B2 | 1/2015 | Ko et al. |
| 8,957,835 B2 | 2/2015 | Hoellwarth |
| 8,982,197 B2 | 3/2015 | Kim et al. |
| 9,051,232 B2 | 6/2015 | Kosuge et al. |
| 9,063,349 B2 | 6/2015 | Ishak et al. |
| 9,122,089 B2 | 9/2015 | Lee et al. |
| 9,287,471 B2 | 3/2016 | de Brouwer et al. |
| 9,377,569 B2 | 6/2016 | Ishak et al. |
| 9,545,304 B2 | 1/2017 | Ishak |
| 9,575,335 B1 | 2/2017 | McCabe et al. |
| 9,798,163 B2 | 10/2017 | Ishak et al. |
| 9,814,658 B2 | 11/2017 | Ishak et al. |
| 9,927,635 B2 | 3/2018 | Ishak et al. |
| 10,247,980 B2 | 4/2019 | Cho et al. |
| 10,629,129 B2 | 4/2020 | Xiao et al. |
| 10,957,826 B2 | 3/2021 | Itoga et al. |
| 2002/0005509 A1 | 1/2002 | Teng et al. |
| 2002/0018890 A1 | 2/2002 | Sugimachi |
| 2002/0158574 A1 | 10/2002 | Wolk et al. |
| 2003/0214695 A1 | 11/2003 | Abramson et al. |
| 2004/0070726 A1 | 4/2004 | Ishak |
| 2004/0114242 A1 | 6/2004 | Sharp |
| 2004/0166342 A1 | 8/2004 | Wursche et al. |
| 2004/0181006 A1 | 9/2004 | Warren et al. |
| 2004/0232813 A1 | 11/2004 | Nakano et al. |
| 2004/0246413 A1 | 12/2004 | Stephenson et al. |
| 2005/0042531 A1 | 2/2005 | Lee et al. |
| 2005/0259082 A1 | 11/2005 | Potsch |
| 2005/0275769 A1 | 12/2005 | Roh et al. |
| 2006/0012754 A1 | 1/2006 | Larson et al. |
| 2006/0040416 A1 | 2/2006 | Sano |
| 2006/0045989 A1 | 3/2006 | Minami |
| 2007/0013649 A1 | 1/2007 | Kim et al. |
| 2007/0030415 A1 | 2/2007 | Epstein |
| 2007/0058107 A1 | 3/2007 | Im et al. |
| 2007/0077410 A1 | 4/2007 | Shi |

(56) References Cited

U.S. PATENT DOCUMENTS

| | | |
|---|---|---|
| 2007/0078216 A1 | 4/2007 | Cao et al. |
| 2007/0146584 A1 | 6/2007 | Wang et al. |
| 2007/0195404 A1 | 8/2007 | Iijima |
| 2007/0216861 A1 | 9/2007 | Ishak et al. |
| 2007/0275184 A1 | 11/2007 | Lee et al. |
| 2008/0094566 A1 | 4/2008 | Ishak et al. |
| 2008/0137030 A1 | 6/2008 | Hoffman |
| 2008/0290787 A1 | 11/2008 | Cok |
| 2008/0297931 A1 | 12/2008 | Ramos |
| 2009/0058250 A1 | 3/2009 | Sin et al. |
| 2009/0105437 A1 | 4/2009 | Determan et al. |
| 2009/0128895 A1 | 5/2009 | Seo et al. |
| 2009/0173958 A1* | 7/2009 | Chakraborty ......... H01L 33/501 257/E33.001 |
| 2009/0236622 A1 | 9/2009 | Nishihara |
| 2010/0022040 A1 | 1/2010 | Konishi et al. |
| 2010/0039704 A1 | 2/2010 | Hayashi et al. |
| 2010/0118511 A1 | 5/2010 | Wegat |
| 2010/0134879 A1 | 6/2010 | Yoshihara et al. |
| 2010/0231830 A1 | 9/2010 | Hirakata et al. |
| 2011/0019269 A1 | 1/2011 | Dirk |
| 2011/0043486 A1 | 2/2011 | Hagiwara et al. |
| 2011/0157546 A1 | 6/2011 | Ishak et al. |
| 2011/0176325 A1 | 7/2011 | Sherman et al. |
| 2011/0234079 A1 | 9/2011 | Eom et al. |
| 2011/0289654 A1 | 12/2011 | Williams et al. |
| 2011/0291132 A1 | 12/2011 | Liu et al. |
| 2011/0299168 A1 | 12/2011 | Combs |
| 2011/0299284 A1 | 12/2011 | Van de Ven et al. |
| 2011/0315939 A1 | 12/2011 | Okayasu et al. |
| 2012/0021152 A1 | 1/2012 | Glaser et al. |
| 2012/0038861 A1 | 2/2012 | van Lieshout et al. |
| 2012/0075577 A1 | 3/2012 | Ishak et al. |
| 2012/0113672 A1* | 5/2012 | Dubrow ............... G02B 6/0061 977/774 |
| 2012/0120515 A1 | 5/2012 | Ishak et al. |
| 2012/0162106 A1 | 6/2012 | Choi et al. |
| 2012/0162752 A1 | 6/2012 | Kitano et al. |
| 2012/0217865 A1 | 8/2012 | Cabalu et al. |
| 2013/0009059 A1 | 1/2013 | Caruso |
| 2013/0063493 A1 | 3/2013 | House |
| 2013/0156999 A1 | 6/2013 | Braesch et al. |
| 2013/0239874 A1 | 9/2013 | Smith et al. |
| 2013/0278134 A1 | 10/2013 | Ko et al. |
| 2013/0282115 A1 | 10/2013 | Ishak |
| 2014/0009061 A1 | 1/2014 | Itoga et al. |
| 2014/0009912 A1 | 1/2014 | Wheatley et al. |
| 2014/0022779 A1 | 1/2014 | Su et al. |
| 2014/0049700 A1 | 2/2014 | Chen et al. |
| 2014/0055736 A1 | 2/2014 | Ishak |
| 2014/0078420 A1 | 3/2014 | Liu et al. |
| 2014/0093661 A1 | 4/2014 | Trajkovska et al. |
| 2014/0175505 A1 | 6/2014 | Yamazaki et al. |
| 2014/0233105 A1 | 8/2014 | Schmeder et al. |
| 2014/0350146 A1 | 11/2014 | Tsubouchi |
| 2014/0355106 A1 | 12/2014 | Laluet et al. |
| 2014/0363767 A1 | 12/2014 | Murakami et al. |
| 2015/0036379 A1 | 2/2015 | Lee |
| 2015/0064123 A1 | 3/2015 | Ishak et al. |
| 2015/0098058 A1 | 4/2015 | De Ayguavives et al. |
| 2015/0124188 A1* | 5/2015 | Kadowaki ......... G02F 1/133528 359/851 |
| 2015/0160478 A1 | 6/2015 | Ishak et al. |
| 2015/0187987 A1 | 7/2015 | Sim et al. |
| 2015/0212238 A1 | 7/2015 | Chang |
| 2015/0212352 A1 | 7/2015 | Guo et al. |
| 2015/0238308 A1 | 8/2015 | Ishak et al. |
| 2015/0248033 A1 | 9/2015 | Zhu et al. |
| 2015/0253653 A1 | 9/2015 | Fujita et al. |
| 2015/0277003 A1 | 10/2015 | Sanchez Ramos |
| 2015/0311402 A1 | 10/2015 | van de Ven |
| 2015/0329684 A1 | 11/2015 | Kamimoto et al. |
| 2015/0338561 A1 | 11/2015 | Moe et al. |
| 2015/0378217 A1 | 12/2015 | Kim et al. |
| 2016/0126428 A1 | 5/2016 | Hosokawa et al. |
| 2016/0170234 A1 | 6/2016 | Ishak et al. |
| 2017/0037308 A1 | 2/2017 | Römer et al. |
| 2017/0309235 A1 | 10/2017 | Garcia Manchado |
| 2017/0315405 A1 | 11/2017 | Masuda et al. |
| 2017/0363884 A1 | 12/2017 | Hallock et al. |
| 2018/0052362 A1* | 2/2018 | Kang ................ G02F 1/133528 |
| 2018/0064616 A1 | 3/2018 | Ishak et al. |
| 2018/0107050 A1 | 4/2018 | Barrett et al. |
| 2018/0113327 A1 | 4/2018 | Ishak et al. |
| 2019/0004223 A1 | 1/2019 | Sanchez Ramos et al. |
| 2019/0103523 A1 | 4/2019 | Choi et al. |
| 2019/0121176 A1 | 4/2019 | Lee et al. |
| 2019/0196071 A1 | 6/2019 | Barrett et al. |
| 2019/0219751 A1 | 7/2019 | Barrett et al. |
| 2019/0285941 A1 | 9/2019 | Liu et al. |
| 2019/0312185 A1 | 10/2019 | Zhang et al. |
| 2020/0124781 A1 | 4/2020 | Tseng et al. |
| 2020/0166798 A1 | 5/2020 | Garbar et al. |
| 2020/0174168 A1 | 6/2020 | Barrett |
| 2020/0249520 A1 | 8/2020 | Barrett et al. |
| 2020/0286962 A1 | 9/2020 | Lee et al. |
| 2020/0303598 A1 | 9/2020 | Kim et al. |
| 2021/0043807 A1 | 2/2021 | Harris et al. |
| 2021/0098661 A1 | 4/2021 | Harris et al. |
| 2021/0116612 A1 | 4/2021 | Barrett et al. |
| 2021/0165276 A1 | 6/2021 | Garbar et al. |
| 2021/0273141 A1 | 9/2021 | Harris et al. |

FOREIGN PATENT DOCUMENTS

| | | |
|---|---|---|
| CN | 101216611 A | 7/2008 |
| CN | 101529311 A | 9/2009 |
| CN | 101646972 A | 2/2010 |
| CN | 101899222 A | 12/2010 |
| CN | 201666985 U | 12/2010 |
| CN | 102879920 A | 1/2013 |
| CN | 102898800 A | 1/2013 |
| CN | 202847016 U | 4/2013 |
| CN | 103448312 A | 12/2013 |
| CN | 203410122 U | 1/2014 |
| CN | 103941320 A | 7/2014 |
| CN | 204213761 U * | 3/2015 |
| CN | 204213761 U | 3/2015 |
| CN | 104614786 A | 5/2015 |
| CN | 104950515 A | 9/2015 |
| CN | 105788474 A | 7/2016 |
| CN | 106324908 A | 1/2017 |
| CN | 107808919 A | 3/2018 |
| CN | 209782327 U | 12/2019 |
| DE | 202014000982 U1 | 4/2014 |
| EP | 0509727 B1 | 6/1997 |
| EP | 0965034 B1 | 5/2007 |
| EP | 0855602 B1 | 3/2008 |
| EP | 2085798 A1 | 8/2009 |
| EP | 2095177 A1 | 9/2009 |
| EP | 2096471 A1 | 9/2009 |
| EP | 2128889 A1 | 12/2009 |
| EP | 2260348 A2 | 12/2010 |
| EP | 1794240 B1 | 1/2013 |
| EP | 2874001 A1 | 5/2015 |
| EP | 3026485 A2 | 6/2016 |
| ES | 1094781 | 12/2013 |
| FR | 2909779 A1 | 6/2008 |
| JP | 2001228323 A | 8/2001 |
| JP | 2001315240 A | 11/2001 |
| JP | 2003149605 A | 5/2003 |
| JP | 2003279988 A | 10/2003 |
| JP | 2006031030 A | 2/2006 |
| JP | 2006278980 A | 10/2006 |
| JP | 2007150228 A | 6/2007 |
| JP | 2007317896 A | 12/2007 |
| JP | 2010511205 A | 4/2010 |
| JP | 2010261986 A | 11/2010 |
| JP | 2011039093 A | 2/2011 |
| JP | 2011-144280 A | 7/2011 |
| JP | 2013067811 A | 4/2013 |
| JP | 2013524300 A | 6/2013 |
| JP | 2013222212 A | 10/2013 |
| JP | 2013238634 A | 11/2013 |

(56) References Cited

FOREIGN PATENT DOCUMENTS

| | | |
|---|---|---|
| JP | 2014000819 A | 1/2014 |
| JP | 2014225030 A | 12/2014 |
| JP | 2016126064 A | 7/2016 |
| JP | 2016128931 A | 7/2016 |
| JP | 2017017317 A | 1/2017 |
| KR | 10-2006-0048986 A | 5/2006 |
| KR | 20160066707 A | 6/2016 |
| KR | 101815619 B1 | 1/2018 |
| WO | 1988002871 A1 | 4/1988 |
| WO | 2002101695 A1 | 12/2002 |
| WO | 03010569 A2 | 2/2003 |
| WO | 2004090589 A1 | 10/2004 |
| WO | 2005034066 A1 | 4/2005 |
| WO | 2005106542 A1 | 11/2005 |
| WO | 2007075520 A2 | 7/2007 |
| WO | 2007109202 A2 | 9/2007 |
| WO | 2007146933 A2 | 12/2007 |
| WO | 2008024414 A2 | 2/2008 |
| WO | 2008067109 A1 | 6/2008 |
| WO | 2008068353 A1 | 6/2008 |
| WO | 2008106449 A1 | 9/2008 |
| WO | 2009123754 A2 | 10/2009 |
| WO | 2010111499 A1 | 9/2010 |
| WO | 2012006265 A1 | 1/2012 |
| WO | 2013123592 A1 | 8/2013 |
| WO | 2013176888 A1 | 11/2013 |
| WO | 2013188825 A1 | 12/2013 |
| WO | 2014055513 A1 | 4/2014 |
| WO | 2014077166 A1 | 5/2014 |
| WO | 2014096475 A1 | 6/2014 |
| WO | 2014155787 A1 | 10/2014 |
| WO | 2014196638 A1 | 12/2014 |
| WO | 2015179761 A1 | 11/2015 |
| WO | 2016179906 A1 | 11/2016 |
| WO | 2016205260 A1 | 12/2016 |
| WO | 2017039024 A1 | 3/2017 |
| WO | 2019099554 A1 | 5/2019 |
| WO | 2021108105 A1 | 6/2021 |
| WO | 2021108107 A1 | 6/2021 |

OTHER PUBLICATIONS

International Search Report and Written Opinion for International Application No. PCT/US2015/032175, dated Aug. 28, 2015; date of filing: May 22, 2015; 10 pp.
Search Report and Examination Opinion for European Application No. 15796219.2; dated Aug. 12, 2017; date of filing: May 22, 2015; 7 pp.
Search Report and Examination Opinion for European Application No. 15796219.2; dated Mar. 26, 2019; date of filing: May 22, 2015; 5 pp.
First Office Action for C.N. Application No. 201580040377.2 (national phase of PCT/US2015/032175); dated Feb. 24, 2018; date of filing: May 22, 2015; 5 pp.
Second Office Action for C.N. Application No. 201580040377.2 (national phase of PCT/US2015/032175); dated Jan. 2, 2019; date of filing: May 22, 2015; 12 pp.
First Office Action for J.P. Application No. 2017-032775 (national phase of PCT/US2015/032175); dated May 15, 2019; date of filing: May 22, 2015; 6 pp.
Second Office Action for J.P. Application No. 2017-032775 (national phase of PCT/US2015/032175); dated Feb. 4, 2020; date of filing: May 22, 2015; 22 pp.
International Search Report and Written Opinion for International Application No. PCT/US2016/037457, dated Sep. 16, 2016; date of filing: Jun. 14, 2016; 7 pp.
First Office Action for C.N. Application No. 201680048240.6 (national phase of PCT/US2016/037457); dated Jan. 16, 2020; date of filing: Jun. 14, 2016; 10 pp.
Non-Final Office Action for U.S. Appl. No. 15/844,109; dated Sep. 4, 2019; date of filing: Dec. 15, 2017; 49 pp.
Final Office Action for U.S. Appl. No. 15/844,109; dated Jan. 16, 2020; date of filing: Dec. 15, 2017; 12 pp.
International Search Report and Written Opinion for International Application No. PCT/US2018/061103, dated Jan. 24, 2019; date of filing: Nov. 14, 2018; 6 pp.
Non-Final Office Action for U.S. Appl. No. 16/360,599; dated Jun. 28, 2019; date of filing: Mar. 21, 2019; 11 pp.
Non-Final Office Action for U.S. Appl. No. 16/695,983; dated Jun. 30, 2020; date of filing: Nov. 26, 2019; 24 pp.
Non-Final Office Action for U.S. Appl. No. 16/855,497; dated Jul. 1, 2020; date of filing: Apr. 22, 2020; 13 pp.
Final Office Action for U.S. Appl. No. 16/855,497; dated Sep. 22, 2020; date of filing: Apr. 22, 2020; 12 pp.
Non-Final Office Action for U.S. Appl. No. 15/813,010; dated Nov. 6, 2020; date of filing Nov. 14, 2017; 9 pp.
First Office Action for Chinese Application No. 201880073490.4 (English Translation); dated Feb. 1, 2021; date of filing: May 13, 2020; 9 pp.
Second Office Action for Chinese Application No. 201880073490.4 (English Translation); dated Apr. 20, 2021; date of filing: May 13, 2020; 8 pp.
First Office Action for Japanese Application No. 2020-526348 (English Translation); dated Mar. 11, 2021; date of filing: May 13, 2020; 6 pp.
Non-Final Office Action for U.S. Appl. No. 17/177,920; dated Apr. 15, 2021; date of filing: Feb. 17, 2021; 10 pp.
Non-Final Office Action for U.S. Appl. No. 16/695,983; dated Aug. 20, 2020; date of filing: Nov. 26, 2019; 15 pp.
International Search Report and Written Opinion for International Application No. PCT/US2020/059308, dated Dec. 18, 2020; date of filing: Nov. 6, 2020; 8 pp.
Non-Final Office Action for U.S. Appl. No. 17/121,695; dated Feb. 2, 2021; date of filing: Dec. 14, 2020; 11 pp.
Non-Final Office Action for U.S. Appl. No. 16/696,516; dated Feb. 1, 2021; date of filing: Nov. 26, 2019; 9 pp.
International Search Report and Written Opinion for International Application No. PCT/US2020/059208, dated Feb. 5, 2020; date of filing: Nov. 5, 2020; 9 pp.
Office Action pertaining to corresponding Chinese Patent Application No. 201680048240.6, dated Jan. 18, 2021.
Office Action pertaining to corresponding Chinese Patent Application No. 201680048240.6, dated Jul. 9, 2020.
Andres Cantarero; Raman scattering applies to materials science; ScienceDirect; 2015; pp. 113-122; vol. 9; Elsevier.
Supplementary European Search Report and Written Opinion for EP Application No. 18879246.9, dated Dec. 18, 2020; date of filing: Nov. 14, 2018; 5 pp.
Second Office Action for Japanese Application No. 2020-526348 (English Translation); dated Aug. 3, 2021; date of filing: May 13, 2020; 6 pp.
Office Action pertaining to corresponding Korean Patent Application No. 20-2020-7000024, dated Aug. 19, 2020; 3 pp.
Office Action pertaining to corresponding Chinese Patent Application No. 201680048240.6, dated Sep. 13, 2021, 16 pages.
Abramowitz, Mortimer and Davidson, Michael W. "Kodak Color Compensating Filters Yellow." Olympus Microscopy Resource Center. olympus-lifescience.com. Retrieved May 16, 2019.
Doeffinger, Derek, editor. Using Filters. Eastman Kodak Company, 1988. The Kodak Workshop Series, pp. 11, 13, 17, 46, 68-69.
Fonseca, "Apple patents a virtual reality headset for iPhone," http://vr-zone.com/articles/apple-patents-virtual-reality-headset-iphone/87267.html, Jun. 22, 2015, 4 pp.
Van der Lely, et al., "Blue Blocker Glasses as a Countermeasure for Alerting Effects of Evening Light-Emitting Diode Screen Exposure in Male Teenagers," Journal of Adolescent Health, Aug. 2014, 7 pp.
Kim, Boris F. and Bohandy, Joseph. "Spectroscopy of Porphyrins." Johns Hopkins APL Technical Digest, vol. 2, No. 1, 1981, pp. 153-163, www.jhuapl.edu/techdigest/views/pdfs/V02_N3.../V2_N3_1981_Kim. Retrieved Apr. 12, 2019.
Giovannetti, Rita. "The Use of Spectrophotometry UV-Vis for the Study of Porphyrins." Macro to Nano Spectroscopy, Uddin, Jamal (Ed.), IntechOpen Limited, 2012, pp. 87-108, www.intechopen.com/

(56) References Cited

OTHER PUBLICATIONS books/macro-to-nano-spectroscopy/the-use-of-spectrophotometry-uv-vis-for-thestudy-of-porphyrins. Retrieved Apr. 12, 2019.
Fritz, Norman L. "Filters: An Aid in Color-Infrared Photography." Photogrammetric Engineering and Remote Sensing, vol. 43, No. 1, Jan. 1977, pp. 61-72, www.asprs.org/wp-content/uploads/?pers/1977journal/.../1977_jan_61-72. Retrieved Apr. 4, 2019.
Perovich, B. W. "Black and White Filters Tutorial." Freestyle Photographic Supplies. www.freestylephoto.biz/black-and-white-filters-tutorial. Retrieved Apr. 12, 2019.
Richards, Bryce S. "Up- and Down-Conversion Materials for Photovoltaic Devices" Proceedings of SPIE—The International Society for Optical Engineering, 9 pp. Apr. 2012.
Simmons, Adam "The Evolution of LED Backlights." PC Monitors www.pcmonitorsinfo/articles. Retrieved May 1, 2017.
Gallas, Jim and Eisner, Mel; Chapter 23—Eye protection from sunlight damage; Journal; 2001; 437, 439-455 vol. 3. Comprehensive Series in Photosciences, Elvesier, abstract only.
Li, Wei, "Solar Cell Materials and Applications Thereof", University of Electronic Science and Technology of China Press, Jan. 31, 2014, pp. 255-257.
Sun, Shunqing, "Research on Organic Optical Information Storage Materials—Optical, Thermal and Thin Film Optical Properties of Indoles Cyanine Dyes", Post-doctoral Research Report of Institute of Photographic Chemistry of the Chinese Academy of Sciences, Dec. 31, 1993, pp. 6-7.
"Capturing All the Light: Panchromatic Visible Absorption for Solar Photoconversion." U.S. Department of Energy, Basic Energy Sciences, Jun. 1, 2014, science.energy.gov/bes/highlights/2014/bes-2014-06-g/. Retrieved Apr. 12, 2019.
"Filters for Color Photomicrography," Olympus America Inc., Olympus Microscopy Resource Center, http://www.olympusmicro.com/primer/photomicrography/colorfilters.html, Mar. 2012, 7 pp.
"Kentek Laser Safe Window Protection", Retrieved at <<http://www.kenteklaserstore.com/category.aspx?categoryID=311>>, 1 pp. Retrieved on Apr. 28, 2014.
"Laser and fluorescent dyes, UV and NIR dyes, security inks and other optically functional materials", Retrieved at http://www.fabricolorholding.com/product, 2 pp. Retrieved May 18, 2015.
"Reticare, the first ocular protector for electronic device screens to launch at CES 2014"; https://www.reticare.com/tienda/en/blog/post/3-reticare-the-first-ocular-protector-for-electronic-device-screens-to-launch-at-ces-2014; Jan. 10, 2014; 7 pp. Retrieved Nov. 30, 2017.
"Spectral-Transmittance Bar Charts for Selected Kodak Wratten Filters." google search (www.google.com), search terms: kodak wratten filters bar chart, second image (wratten filter specs, iclane.net). Retrieved May 16, 2019.
"XGear Krystal Sapphire Screen Protector Film Shield For Apple IPhone 4 4S", Retrieved at <<http://www.ebay.com/itm/XGear-Krystal-Sapphire-Screen-Protector-Film-Shield-For-Apple-IPhone-4-4S-/221364527502>>, 3 pp. Retrieved Apr. 28, 2014.
ebay.com, screenshot of ebay purchase of Apr. 23, 2019. Retrieved May 16, 2019.
Iluminant D65, 4 pp.
Kodak advertisement. Buchsbaum, Ralph. Animals Without Backbones. The University of Chicago Press, 1948.
"290 nm UV Dye", Technical Data Sheet, Product Code: UV290A, QCR Solutions Corp, Version: 2011.UV Dyes, www.qcrsolutions.com, 1 page.
"530 nm Visible Dye", Technical Data Sheet, Product Code: VIS530A, QCR Solutions Corp, Version: 2011.VIS Dyes, www.qcrsolutions.com, 1 page.
"675 nm Visible Dye", Technical Data Sheet, Product Code: VIS675F, QCR Solutions Corp, Version: 2011.VIS Dyes, www.qcrsolutions.com, 1 page.
"ABS 668: Visible Narrow Band Absorber", Exciton, Inc., www.exciton.com, 1 page.
"ABS 691: Visible Narrow Band Absorber", Exciton, Inc., www.exciton.com, 1 page.

"DYE VIS 347", Adam Gates & Company, LLC, www.adamgatescompany.com, 1 page.
"DYE VIS 670", Adam Gates & Company, LLC, www.adamgatescompany.com, 1 page.
"DYE VIS 671", Adam Gates & Company, LLC, www.adamgatescompany.com, 1 page.
"ADS640PP Product Specification", American Dye Source, Inc., Retrieved at <<http://www.adsdyes.com/products/ADS640PP.html>>, Retrieved on May 18, 2015, 1 page.
"Infrared Dye 1422", Adam Gates & Company, LLC, www.adamgatescompany.com, 1 page.
"1002 nm NIR Dye", Technical Data Sheet, Product Code: NIR1002A, QCR Solutions Corp, Version 2011.NIR Dyes, www.qcrsolutions.com, 1 page.
"1031 nm NIR Dye", Technical Data Sheet, Product Code: NIR1031M, QCR Solutions Corp, Version: 2011.NIR Dyes, www.qcrsolutions.com, 1 page.
"1072 nm NIR Dye", Technical Data Sheet, Product Code: NIR1072A, QCR Solutions Corp, Version: 2011.NIR Dyes, www.qcrsolutions.com, 1 page.
"1073nm NIR Dye", Technical Data Sheet, Product Code: IR Dye 1151, Adam Gates & Company, LLC, www.adamgatescompany.com, 1 page.
"LUM690 Near Infrared Dye", Moleculum, moleculum.com, Jan. 2015, 2 pages.
"LUM995 Near Infrared Dye", Moleculum, moleculum.com, Jan. 2015, 2 pages.
"Near Infared Dye: LUM1000A", Moleculum, moleculum.com, Jan. 2015, 1 page.
"Tinuvin P Benzotriazole UV Absorber", Ciba Specialty Chemicals, Inc.,Printing Date: Aug. 1998, 2 pages.
A-594-5 Invisible Blue Pigment, dayglo.com, 1 page. Retrieved Jun. 2, 2019.
Sunstone Luminescent UCP Nanocrystals, sigmaaldrich.com, 7 pp. Retrieved Apr. 17, 2017.
"New ANSI/ISEA Z87. Jan. 2010 Standard", Uvex by Sperian, 2 pages.
ANSI Z80.3-2015, Nonprescription Sunglass and Fashion Eyewear Requirements, 41 pp.
ASTM International E 313-05; Standard Practice for Calculating Yellowness and Whiteness Indices from Instrumentally Measured Color Coordinates; Article; 6 pp.
U.S. Appl. No. 17/306,605, filed May 3, 2021; 25 pp.
U.S. Appl. No. 17/348,570, filed Jun. 15, 2021; 30 pp.
Non-Final Office Action for U.S. Appl. No. 14/719,604; dated Aug. 24, 2016; date of filing: May 22, 2015; 41 pp.
Final Office Action for U.S. Appl. No. 14/719,604; dated Mar. 28, 2017; date of filing: May 22, 2015; 66 pp.
International Search Report and Written Opinion for International Application No. PCT/US2021/052904, dated Dec. 27, 2021; date of filing: Sep. 30, 2021.
Extended European Search Report pertaining to European Patent Application No. 20891730.2, dated Dec. 14, 2021.
Office Action pertaining to corresponding Korean Patent Application No. 10-2021-7021453, dated Dec. 22, 2021.
Examination Report pertaining to corresponding Australian Patent App. No. 2020392315, dated Mar. 31, 2022.
Examination Report pertaining to corresponding Australian Patent App. No. 2020393812, dated Mar. 30, 2022.
Office Action pertaining to corresponding Canadian Patent App. No. 3152206, dated Apr. 22, 2022.
Office Action pertaining to corresponding Canadian Patent App. No. 3154694, dated Apr. 27, 2022.
Office Action pertaining to corresponding U.S. Appl. No. 17/465,216, dated Jun. 8, 2022.
Office Action pertaining to corresponding Japanese Patent App No. 2021-541465, dated Jun. 28, 2022.
Office Action pertaining to corresponding Japanese Patent App. No. 2021-542506, dated Jun. 21, 2022.
Final Rejection pertaining to corresponding U.S. Appl. No. 17/465,216, dated Sep. 30, 2022.
International Search Report and Written Opinion for International Application No. PCT/US2022/031930, dated Sep. 23, 2022.

(56) References Cited

OTHER PUBLICATIONS

Extended European Search Report pertaining to European Patent Application No. 20893018.0, dated Dec. 20, 2022.
Office Action pertaining to Japanese Patent Application No. 2021-542506, dated Dec. 20, 2022.

* cited by examiner

BACKLIGHT UNIT WITH EMISSION MODIFICATION

CROSS-REFERENCE TO RELATED APPLICATIONS

This application is a continuation-in-part of copending U.S. patent application Ser. No. 17/177,920, currently allowed, filed Feb. 17, 2021, which in turn is a continuation-in-part of and claims priority to U.S. patent application Ser. No. 16/695,983, now issued as U.S. Pat. No. 10,955,697, filed Dec. 6, 2019, and titled LIGHT EMISSION MODIFICATION. This application is related to U.S. Nonprovisional patent application Ser. No. 14/719,604, filed May 22, 2015, currently abandoned, and titled LIGHT EMISSION REDUCING FILM FOR ELECTRONIC DEVICES, International Application under the Patent Cooperation Treaty No. PCT/US15/032175, now expired, and filed May 22, 2015 and titled LIGHT EMISSION REDUCING FILM FOR ELECTRONIC DEVICES, International Application under the Patent Cooperation Treaty No. PCT/US16/037457, now expired, and filed Jun. 14, 2016 and titled LIGHT EMISSION REDUCING COMPOUNDS FOR ELECTRONIC DEVICES, and any other U.S., International, or national phase patent applications stemming from the aforementioned applications. All references cited within are incorporated herein by reference in their entirety.

FIELD

The present disclosure relates to backlight modules for electronic display systems that include light conversion materials.

BACKGROUND

Handheld, tablet, computer, and other device displays have trended toward higher resolutions and truer color balance. While a variety of methods can be used to achieve resolution and color, many high-performance displays include LEDs that can result in high levels of blue within the output spectrum. Many of these devices are battery-powered and users, typically, desire long battery life. Longer battery life generally calls for low power consumption, as well as various means for light conservation. Frequently these displays generally have not prioritized eye safety as a design goal. A growing body of medical research is developing that indicates a "toxic" blue portion of the color spectrum can have adverse effects on the eye such that in the longer term, vision impairment can result. In addition, a new body of knowledge is showing that adverse effects can occur on the natural circadian rhythm of individuals from certain portions of the optical spectrum. The present disclosure describes materials and incorporation of these materials in a mobile, tablet or PC display that are highly selective in their ability to reduce exposure to harmful blue and UV light. These materials can be optimized as a function of wavelength to maintain color white point. Many of these materials reduce total light transmission. However, some of these materials, as described in the present disclosure, can convert or recycle harmful portions of the spectrum to optical wavelengths that are not harmful. In this manner, a balance of reduction of harmful color frequencies, maintenance of optical clarity, and maintenance of true white color balance can be achieved with minimal loss in display brightness. In light of recent medical findings, increasingly ubiquitous displays, and consumer demand for high quality in displays, systems of the present disclosure solve multiple needs in a unique way.

SUMMARY

To address eye safety, display systems are provided that incorporate materials into mobile, tablet, or personal computer displays that are can reduce exposure to harmful or toxic blue and ultraviolet light. The instant disclosure provides backlight modules (units) for display systems that include materials that can convert or recycle harmful portions of the visible electromagnetic spectrum into optical wavelengths that are less harmful while maintaining a balance of reduction in harmful color frequencies, maintenance of optical clarity, and maintenance of true white color balance with minimum loss in display brightness.

In one aspect, a display system for use with electronic display devices is disclosed that includes an electronic display device and a backlight unit that includes a light-emitting array. A reflector can be adjacent to the light-emitting array and a diffuser can be positioned opposite the reflector. A first brightness enhancing layer can be adjacent to the diffuser. The disclosed backlight unit can include an optical film having at least one light conversion material or at least one light absorbing material. In some embodiments, the at least one light conversion material can be used in combination with at least one light absorbing material to reduce hazardous blue light emissions between about 400 nm to about 500 nm. In some embodiments, the at least one light conversion material can be quantum dots or luminescent nanoparticles. In some other embodiments, the disclosed backlight unit can include a light-guide plate having an edge, a bottom face, and a top face and the light-emitting array can be structured and configured to inject light into the light-guide plate. The disclosed backlight unit can also include a reflector adjacent to the bottom face of the light-guide plate, opposite the diffuser, a second brightness enhancing layer adjacent to the first brightness enhancing layer, and a polarizing filter adjacent to the second brightness enhancing layer.

In another aspect, a method of enhancing blue light absorption about 400 nm to about 500 nm) in a backlight unit is disclosed that includes providing a display device for use with electronic display devices the includes an electronic display device and a backlight unit that includes an optical stack. The backlight unit can include a light-emitting array, a reflector adjacent to the light-emitting array, a diffuser opposite the reflector and a first brightness enhancing layer adjacent to the diffuser. The method further includes inserting an optical film having at least one light conversion layer or at least one light absorbing layer into the optical stack adjacent to the first brightness enhancing layer. In some embodiments, the at least one light conversion material can be quantum dots or luminescent nanoparticles. In some embodiments, the at least one light conversion layer can be used in combination with the at least one light absorbing layer to reduce hazardous blue light emissions between about 400 nm and about 500 nm.

In the present disclosure, the term, "light absorbing material" or "light absorbing layer" refers to an optical film that only absorbs light in a particular wavelength range;

the term, "light conversion material" or "light conversion layer" refers to an optical film that absorbs light at one wavelength range and reemits light at a higher wavelength range; and the term, "optical film" refers to a layer of light absorbing material or light conversion material that may be neat or may be disposed upon a transparent carrier layer.

Features and advantages of the present disclosure will be more readily understood from the following detailed description which should be read in conjunction with the accompanying drawings.

BRIEF DESCRIPTION OF THE DRAWING

The drawings are schematic illustrations and are not intended to limit the scope of the invention in any way. The drawing is not necessarily to scale.

In this application:

the term, "adjacent" refers to layers that are either directly next to one another or are separated, at most, by one additional layer;

the terms, "blue light" or "toxic blue light" refer to light having wavelength ranges of about 400 nm to about 500 nm or about 415 nm to about 455 nm respectively;

the term, "disposed upon" refers to a layer that is either directly in contact with another layer or is adjacent to the other layer;

the term, "light-emitting diode array" refers to one or more light-emitting diodes in a matrix, usually two-dimensional; and the term, "optical stack" refers to the layers in a backlight unit that emit light, are optically transparent to that light, or modify the properties of that light. These layers can be adjacent to one another.

DETAILED DESCRIPTION

Various embodiments will be described in detail with reference to the drawing. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

Figure 1:
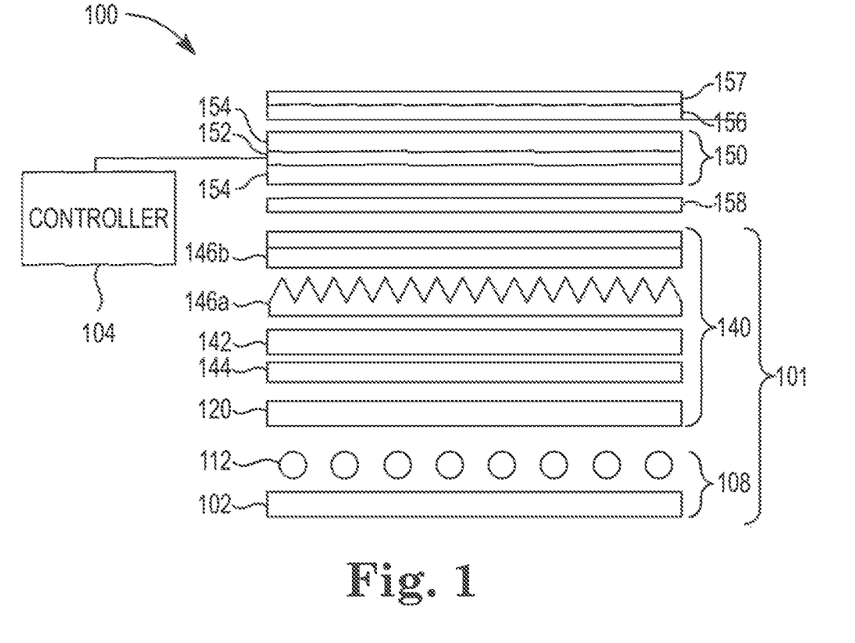
FIG. 1 is a schematic cross-sectional view of an exemplary display system according to this disclosure.

FIG. 1 is a schematic cross-sectional view of an example display system 100 with which systems of the present disclosure may be beneficially employed. Display system 100 may be used, for example, in a liquid crystal display (LCD) monitor, LCD-TV, handheld, tablet, laptop, or other computing device. Display system 100 of FIG. 1 is merely exemplary, however, and the systems of the present disclosure are not limited to use with systems like or similar to system 100. The systems of the present disclosure may be beneficially employed in other varieties of displays systems that do not necessarily include liquid crystal display technology.

Display systems according to this disclosure can include backlight units that include optical stacks. The disclosed optical stacks can include light-emission systems such as light-emitting diodes, arrays of light-emitting diodes or other sources of substantially white light. These optical stacks can include layers of optical films that can pass the light transparently or can modify properties of the light passing therethrough. This can include reflection layers, diffusion layers, brightness enhancing layers (usually prismatic), and polarizing filters, to name a few. In some embodiments the optical stacks can include at least one optical film having at least one light conversion layer therewithin. Additionally, either that same at least one optical film can have light absorption layers thereon or therewithin. Alternatively, the optical stack can include at least one optical film having at least one light conversion material and at least one optical film having at least one light absorption disposed thereon or therewithin.

Display system 100 can include liquid crystal (LC) panel 150 and illumination assembly 101 positioned to provide illumination light to LC panel 150. LC panel 150 includes LC layer 152 disposed between panel plates 154. Plates 154 can include electrode structures and alignment layers on their inner surfaces for controlling the orientation of the liquid crystals in the LC layer 152. These light fixtures can be arranged so as to define LC panel pixels. A color filter can also be included with one or more of plates 152 for imposing color on the image displayed by LC panel 150.

LC panel 150 can be positioned between upper absorbing polarizer 156 and lower absorbing polarizer 158. Absorbing polarizers 156, 158 and LC panel 150 in combination can control the transmission of light from illumination assembly 101 to a viewer, the viewer generally being positioned toward the top of FIG. 1 and looking generally downward (relative to FIG. 1) at display system 100. Controller 104 can selectively activate pixels of LC layer 152 to form an image seen by the viewer.

One or more optional layers 157, can be provided over upper absorbing polarizer 156, for example, to provide optical function and/or mechanical and/or environmental protection to the display.

Illumination assembly 101 can include backlight 108 and one or more light management films 140 positioned between backlight 108 and LC panel 150. Backlight unit 108 can be used to collect light from light source 112 and redirect it toward the front of display system 100. Backlight 108 of display system 100 include light sources 112 that generate the light that illuminates LC panel 150. Light sources 112 can include any suitable lighting technology. In some embodiments, light sources 112 can be light-emitting diodes (LEDs), and in some cases, can be white LEDs. Backlight 108 as illustrated can be a "direct-lit" backlight in which an array of light sources 112 are located behind LC panel 150 substantially across much or all of the panel's area. Backlight 108 as illustrated is merely schematic, however, and many other backlight configurations are possible. Some display systems, for example, can include a "side-lit" backlight with light sources (such as LEDs) located at one or more sides of a light-guide that can distribute the light from the light sources substantially across much or all of the area of LC panel 150.

In some embodiments, backlight 108 emits generally white light, and LC panel 150 is combined with a color filter matrix to form groups of multicolored pixels so that the displayed image is polychromatic.

Backlight 108 also includes reflective substrate 102 for reflecting light from light sources 112 propagating in a direction away from LC panel 150. Reflective substrate 102 may also be useful for recycling light within display system 100. In some embodiments, a light-emitting array is contemplated. Such a light-emitting array can include a matrix of arranged light-emitting diodes that can, in some embodiments, be embedded with a reflector or individual reflectors and a diffuser or diffusers therewithin. In these embodiments, the reflector and/or diffuser layers may not be separate layers in the optical stack but are part of the light-emitting array.

Arrangement 140 of light management films, which may also be referred to as a film stack, a backlight film stack, or a light management unit, can be positioned between backlight 108 and LC panel 150. Light management films 140 can affect the illumination light propagating from backlight 108 so as to improve the operation of display system 100. Light management unit 140 need not necessarily include all components as illustrated and described herein.

Arrangement 140 of light management films can include diffuser 120. Diffuser 120 can diffuse the light received from light sources 112, which can result in increased uniformity of the illumination light incident on LC panel 150. Diffuser layer 120 may be any suitable diffuser film or plate.

Light management unit 140 can include reflective polarizer 142. Light sources 112 typically produce unpolarized light, but lower absorbing polarizer 158 only transmits a single polarization state; therefore, about half of the light generated by light sources 112 is not transmitted through to LC layer 152. Reflective polarizer 142, however, may be used to reflect the light that would otherwise be absorbed in lower absorbing polarizer 158. Consequently, this light may be recycled by reflection between reflective polarizer 142 and underlying display components, including reflective substrate 102. At least some of the light reflected by reflective polarizer 142 may be depolarized and subsequently returned to reflective polarizer 142 in a polarization state that is transmitted through reflective polarizer 142 and lower absorbing polarizer 158 to LC layer 152. In this manner, reflective polarizer 142 can be used to increase the fraction of light emitted by light sources 112 that reaches LC layer 152, thereby providing a brighter display output. Any suitable type of reflective polarizer may be used for reflective polarizer 142.

In some embodiments, polarization control layer 144 can be provided between diffuser plate 120 and reflective polarizer 142. Polarization control layer 144 can be used to change the polarization of light that is reflected from reflective polarizer 142 so that an increased fraction of the recycled light is transmitted through reflective polarizer 142.

Arrangement 140 of light management films can also include one or more brightness enhancing layers. A brightness enhancing layer can include a surface structure that redirects off-axis light in a direction closer to the axis of the display. This can increase the amount of light propagating on-axis through LC layer 152, thus increasing the brightness of the image seen by the viewer. One example of a brightness enhancing layer is a prismatic brightness enhancing layer, which has a number of prismatic ridges that redirect the illumination light through refraction and reflection. Examples of prismatic brightness enhancing layers include BEF prismatic films available from 3M Company. Other varieties of brightness enhancing layers can incorporate non-prismatic structures.

The exemplary embodiment illustrated in FIG. 1 shows first brightness enhancing layer 146a disposed between reflective polarizer 142 and LC panel 150. Prismatic brightness enhancing layer 146a typically provides optical gain in one dimension. An optional second brightness enhancing layer 146b may also be included in arrangement 140 of light management layers, having its prismatic structure oriented orthogonally to the prismatic structure of first brightness enhancing layer 146a. Such a configuration provides an increase in the optical gain of display system 100 in two dimensions. In other exemplary embodiments, brightness enhancing layers 146a, 146b may be positioned between backlight 108 and reflective polarizer 142.

The different layers in light management unit 140 can be free standing. In other embodiments, two or more of the layers in light management unit 140 may be laminated together. In other exemplary embodiments, light management unit 140 may include two or more subassemblies.

It is to be understood that as a schematic diagram, the components of display system 100 are not illustrated to scale, and generally are shown with greatly exaggerated thickness (along the up-down direction of FIG. 1) compared to their lateral extent (along the left-right direction). Many elements of display system 100, including (but not necessarily limited to) 102, 120, 142, 144, 146a, 146b, 152, 154, 156, and 157 can extend in two dimensions generally orthogonal to their thickness (i.e., perpendicular to the plane of FIG. 1) over an area approximately equal to a viewable area of the display, which may be referred to as a "display area."

Returning to backlight 108, in some embodiments light sources 112 can emit significant amounts of light in potentially harmful wavelength ranges, such as UV and blue light ranges (particularly below about 455 nm). In display system 100 that does not include systems of the present disclosure, significant amounts of such potentially harmful light can be emitted by display system 100 toward a user (upward relative to FIG. 1). In this context a "significant" amount of light can mean an amount of light that may result in deleterious health effects for a display user. In view of this hazard, the present disclosure provides systems for reducing the amount of harmful blue light emitted from display systems such as system 100.

In some approaches to mitigating the hazards of blue light emissions from electronic device displays, absorbing materials can be used to reduce the amount of light in particular wavelength ranges (such as UV and blue light wavelength ranges) that reach users' eyes. Some of these solutions are described in U.S. patent application Ser. No. 14/719,604, filed May 22, 2015 and titled LIGHT EMISSION REDUCING FILM FOR ELECTRONIC DEVICES, International Application under the Patent Cooperation Treaty No. PCT/US2015/032175, filed May 22, 2015 and titled LIGHT EMISSION REDUCING FILM FOR ELECTRONIC DEVICES, and PCT Pat. Appl. Ser. No. PCT/US2016/037457, filed Jun. 14, 2016 and titled LIGHT EMISSION REDUCING COMPOUNDS FOR ELECTRONIC DEVICES, which are incorporated by reference limited such that no subject matter is incorporated that is contrary to the explicit disclosure herein.

Approaches to blue light emission mitigation that are based upon absorption of light (or that otherwise remove light), without subsequent emission of light in the visible region of the electromagnetic spectrum, can generally result in a decrease in the brightness (measured and/or perceived) of a display, as compared with an otherwise identical reference display without such absorption features. In some cases, to compensate for such an absorption-related brightness decrease, the power input to a display can be increased (relative to the power input to a reference display). Generally, increases in display power consumption can be undesirable, particularly in portable devices where they may negatively impact battery life.

In the present disclosure, systems for modifying the emission of light from displays are disclosed in which light conversion materials or light absorbing materials can be employed away from light sources (such as light sources 112 of FIG. 1) of a display. Light conversion materials generally can absorb light in a first wavelength range and emit light in a second wavelength range (thus "converting" light from one wavelength range to another). Light absorbing materials only absorb light in one wavelength range. In the present disclosure, conversion from shorter wavelengths to longer wavelengths can be referred to as "upconversion" and conversion from longer wavelengths to shorter wavelengths can be referred to as "downconversion." It should be recognized that these definitions may not be universal, however, and that other documents may define upconversion and downconversion oppositely (for example, some documents may define such terms relative to frequency, which is inversely related to wavelength).

Systems using light conversion materials away from light sources of a display can be used to absorb light in less useful or harmful wavelength ranges, such as UV and blue light ranges (particularly below about 455 nm) and re-emit light in more benign wavelength ranges (from a health perspective) that can be more useful, such as in green and/or red wavelength ranges. In some cases, light can be upconverted from shorter blue wavelengths (at or below about 455 nm) to longer blue wavelengths that can be less harmful and also useful for display illumination. In ways such as these, systems using light conversion materials away from light sources can modify the emission of light from display systems, relative to display systems not employing such light conversion materials.

In some examples, systems using light conversion materials or light absorbing materials away from light sources of a display can be employed with electronic device displays to mitigate blue light emissions such that the resulting display systems can achieve brightnesses comparable to reference displays without light conversion materials or light absorbing layers away from light sources, while consuming not more than 10% more energy than the reference displays.

Systems using light conversion materials or light absorbing materials away from light sources can improve the color balance of a display, compared to some known prior approaches to reducing blue light emissions from a display that do not employ light conversion materials away from light sources. Some such known prior approaches can reduce blue light emissions by absorbing or otherwise removing a portion of blue light from the spectrum, thus altering the spectral balance of the light emitted from the display. In systems of the present disclosure, in addition to reducing the amount of hazardous blue light emitted from an electronic display device, light conversion materials away from light sources can re-emit light that can contribute to, aid, or otherwise improve the color balance of light emitted from an electronic display device, as compared with an otherwise similar display with blue light mitigation that does not include such light conversion materials. In some embodiments, display systems that include systems of the present disclosure incorporating light conversion materials or light absorbing materials away from light sources can maintain a D65 white point. In some embodiments, display systems that include systems of the present disclosure incorporating light conversion materials or light absorbing materials away from light sources can maintain a correlated color temperature (CCT) substantially the same as a reference display system without the blue light mitigation systems of the present disclosure.

In some embodiments of systems of the present disclosure, at least one light conversion material can be used in combination with at least one light absorbing material to reduce hazardous blue light emissions from, and improve or maintain the color balance of, a display system.

Systems of the present disclosure can include multiple light conversion materials or light absorbing materials that can absorb light from multiple wavelength ranges, including wavelength ranges other than UV or blue wavelength ranges.

In some embodiments, systems of the present disclosure can employ light conversion materials that absorb light from a wavelength range that is not considered to pose health risks. The absorption and emission of such a light conversion material can be employed, for example, to improve or otherwise contribute to the color balance of a display.

Any suitable light conversion materials can be used in systems of the present disclosure. Without limitation, employed light conversion materials can include:
  organic materials
  inorganic materials, which can be mined materials
  Raman-scattering materials
  Anti-Stokes materials
  materials known for other non-display applications, such as fingerprint dusting
  fluorescent pigments, such as those available from Day-Glo Color Corp (for example, DAYGLO A-594-5). Surprisingly, materials that are used commonly in applications requiring florescent behavior can be used in light filtering applications with great spectral efficiency.
  luminescent nanocrystals such as SUNSTONE Luminescent UCP Nanocrystals available from Sigma Aldrich Co., LLC.

Organic light conversion materials can include, for example, fluorescent or phosphorescent molecules, organic light-emitting semiconductors (for example, OLEDS), and polymers that include fluorescent or phosphorescent chromophores. Inorganic materials can include, for example, fluorescent or phosphorescent molecules, Raman-scattering materials, Anti-Stokes materials fluorescent or phosphorescent pigments, luminescent nanocrystals, and quantum dots.

Raman-scattering materials are light-scattering materials which absorb photons, emit or absorb phonons and, finally, emit photons. In the case of phonon emission, the process is referred to as "Stokes" while phonon absorption is referred to as "Anti-Stokes". In Anti-Stokes materials the energy of the phonon absorption is larger than the energy of the emitted photon requiring these materials to occur at high temperature. These materials are explained, for example, in Cantarero, "Raman scattering applied to materials science", *Procedia Materials Science,* 9 (2015) 113-122 which is herein incorporated by reference.

Quantum dots (luminescent nanocrystals) are semiconductor particles a few nanometers in size having optical and electronic properties that differ from larger particles due to quantum mechanical effects. The optoelectronic properties of quantum dots can change as a function of size, shape, composition, and structure (solid or hollow).

In some embodiments of systems of the present disclosure, light conversion materials or light absorbing materials can be located in any suitable location away from light sources of the display. In some embodiments, light conversion materials or light absorbing materials can be included in, on, or with one or more films of light management films 140, and or another film or films not illustrated in FIG. 1. In general, light conversion materials can re-emit light with different directionality and/or polarization compared with light absorbed by the light conversion materials. Accordingly, in some embodiments light conversion materials can be included below (relative to the orientation of FIG. 1) one or more of reflective polarizer 142 and/or brightness enhancement layers 146*a*, 146*b*, such that re-emitted light passes through films 142, 146*a*, and 146*b* (if such films are present in the display system) before exiting the display toward a user. However, this is not limiting, and light conversion materials potentially can be located in, or, or with any component of light management films 140.

In some embodiments of systems of the present disclosure, light conversion materials or light absorbing materials can be included in, on, or with a display layer between LC layer 152 and a user, such as layer 157 of FIG. 1. In some embodiments of systems of the present disclosure, light conversion materials or light absorbing materials can be included in, on, or with reflective substrate 102.

In some embodiments of systems of the present disclosure, light conversion materials or light absorbing materials can be distributed substantially about an entire area corresponding to the display area of a display when included or provided in, on, or with a film of light management films 140, reflector 102, or another layer, such as layer 157. In some such embodiments, light conversion materials or light absorbing materials can be distributed substantially uniformly over such an area.

Light conversion materials or light absorbing materials can be included or provided in, on, or with a film of light management films 140, reflector 102, or another layer, such as layer 157, in any suitable manner. In some embodiments, light conversion materials or light absorbing materials can be extruded or cast with a film. In some embodiments, light conversion materials or light absorbing materials can be coated onto a film. In some embodiments, the light conversion materials or light absorbing materials can be included as a separate film layer or coated onto any of the layers that make up the backlight unit. In some embodiments, light conversion materials or light absorbing materials can be provided in or with an adhesive used to bond or laminate one or more layers of a display system, such as any suitable layers or films of display system 100. Such an adhesive incorporating light conversion materials or light absorbing materials can be substantially optically clear, exhibiting negligible scattering of light transmitted through the adhesive, other than redirection of light associated with absorption and re-emission by light conversion materials.

In some embodiments, light conversion materials or light absorbing materials can be solubly or insolubly distributed or dispersed throughout a material that is a component or precursor of any suitable film or layer of display system 100, such as a polymer resin or an adhesive. In some embodiments, light conversion materials or light absorbing materials can comprise nanoparticles, some which may be insoluble in polymers and commonly used solvents. While homogeneous distribution may be more easily achieved in some systems with soluble light conversion materials, heterogeneous even distribution can be achieved with insoluble light conversion material with appropriate handling during manufacture.

In some embodiments, light conversion materials or light absorbing materials can be index-matched to materials or media into which they are incorporated, such that they can appear essentially optically "invisible" in wavelength ranges other than ranges in which they absorb and re-emit light, and that films or other materials incorporating the light conversion materials appear essentially optically clear. In some other embodiments, index differences between light conversion materials, light absorbing materials, and materials or media into which they are incorporated can be exploited for other optical functions, such as (but not necessarily limited to) diffusion and reflection. Index matching or index adjustment can be affected by making inorganic nanoparticles suitably small, and chemically coupling them to an organic adhesive. Likewise, the design of the organic molecule itself can tune index. An example, silicones tend toward relatively lower optical indices while complex hydrocarbons tend toward relatively higher optical indices. Organo-functional ligand ends can modify index in the adhesive.

Systems of the present disclosure incorporating light conversion materials or light absorbing materials can be custom designed to retrofit into existing display systems, with selectable design parameters including choice of light conversion materials, light absorbing materials, and, also other non-converting blocking or filtering compounds. In other examples, new display systems can be designed that employ systems of the present disclosure incorporating light conversion materials. Through judicious choices of LEDs (and/or other light sources), light conversion materials, light absorbing materials, and other non-converting blocking or filtering compounds, and other optical films and devices, numerous combinations of approaches can be developed to provide displays that addresses eye health concerns while providing high display quality.

Figure 2:
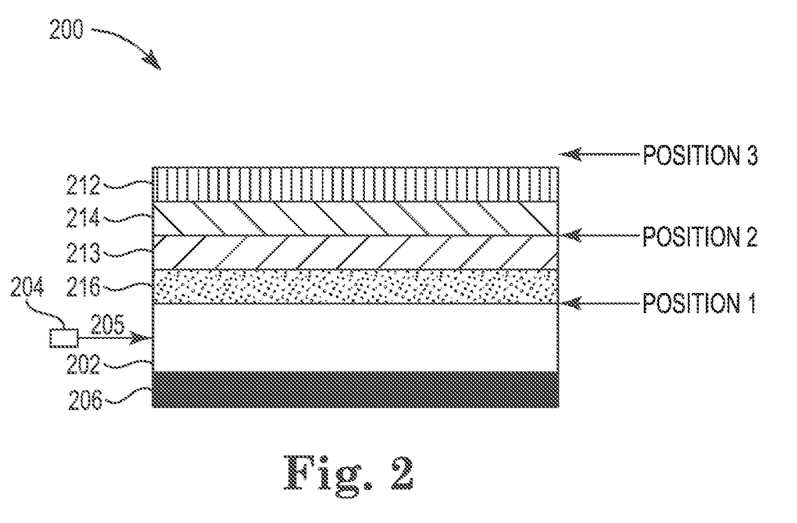
FIG. 2 is a schematic cross-sectional view of embodiments of a backlight unit according to the present disclosure that indicates positions where a light conversion (blue-filtering) layer can be inserted.

FIG. 2 is a schematic cross-sectional view of embodiments of a backlight unit according to the present disclosure that indicates positions where a light conversion or light absorbing (blue-filtering) layer can be inserted. Backlight unit 200 includes light-guide plate 202. Typically, a light-guide plate is a transparent, or semi-transparent colorless, block of material (glass or polymer) that can conduct light. Light-guide plates can be made of many materials such as glass, polyacrylate (acrylic), polycarbonate, or other clear polymers. Light-emitting diode array 204, arranged in a strip as a light source, can be arranged so that light 205 can enter backlight unit 200 through one edge of light-guide plate 202. Alternatively, as shown in FIG. 1, light-emitting diode array 204 can be located below light-guide plate 202. Light-guide plate 202 can have reflector 206 adjacent to it on one or more sides in order to direct the light from light-emitting diode array 204 upward (as shown in FIG. 2) and through backlight unit 200. Additionally, light in backlight unit 200 can distribute itself uniformly through light-guide plate 202 through reflections from reflector 206 and internal reflections on the edges of light-guide plate 202 due to the refractive index difference between light-guide plate and air as well as reflection from the reflector and portions of the backlight unit yet to be described. The light-guide plate can be placed between a reflector layer between the reflector and the diffuser. The impact of this type of construction (illustrated in FIGS. 1 and 2) redirects light from the light source at the edge of a display screen uniformly across the display surface. The uniformity of the light distribution and the efficiency of the light collection (amount of light reaching the display surface vs. amount of light from the light source injected into the light-guide plate) are related to the efficiency of the light-guide plate, the reflector layer, and the diffuser layer or layers.

Diffuser 216 can be disposed adjacent to light-guide plate 202 as shown in FIG. 2. Diffuser 201 can evenly distribute light and eliminate bright spots. Diffusers can come in types, for example, such as holographic, white diffusing glass, and ground glass. Diffusers can be semi-opaque and can reflect light in many different directions. First brightness enhancing layer 213 and second brightness enhancing layer 214 can be prismatic brightness enhancing films. Prismatic brightness enhancing films are described earlier in this disclosure. Adjacent to second brightness enhancing layer 214 can be one or more polarizing filters 214 that lets light of a specific polarization pass through while blocking light waves of other polarizations. In some embodiments, polarizing filters can help reduce reflections and glare by filtering out light that has become polarized due to reflection from non-metallic surfaces. The goal of backlight unit 200 is to distribute light uniformly across the two-dimensional plane of light-guide plate 202, thus providing light to display images across the entirety of the display.

The disclosed backlight unit with emission modification also includes an optical film, the optical film comprising at least one light conversion material or at least one light absorbing material or both. The light conversion material or light absorbing material can absorb light in a first wavelength range and reemit light in a second wavelength range having a higher wavelength. In the instant disclosure, light conversion materials or light absorbing materials are contemplated that absorb blue light, particularly toxic blue light. Useful light conversion materials and light absorbing materials are described, for example, in applicants' co-owned U.S. patent application Ser. No. 15/813,010, currently allowed, filed Nov. 14, 2017 and entitled LIGHT EMISSION REDUCING COMPOUNDS FOR ELECTRONIC DEVICES.

Referring again to FIG. 2, when light 205 is injected into light-guide plate 205, it can reflect within light-guide plate 202, from reflector 206, from diffuser 216, and from prismatic brightness enhancing layers 213 and 214. Light 205 will necessarily eventually pass through the layers of backlight unit 200 multiple times and thus be distributed across the full area of a display located above the top layer of backlight unit 200. This can create an opportunity to amplify the impact of a selective light conversion material or light absorbing material that filters out blue or toxic blue light or any other film or layer that can modify the spectrum. These selective light-conversion material or light absorbing material can be included as a separate film or can be coated onto any of the layers that make up the disclosed backlight unit.

In some embodiments, light-conversion materials (filters) placed in various locations in the backlight unit have been shown to have up to a ten to twelve times amplification of absorption which greatly increases the efficiency of selective light conversion material or light absorbing material that can, for example, filter out blue or toxic blue light.

Figure 3:
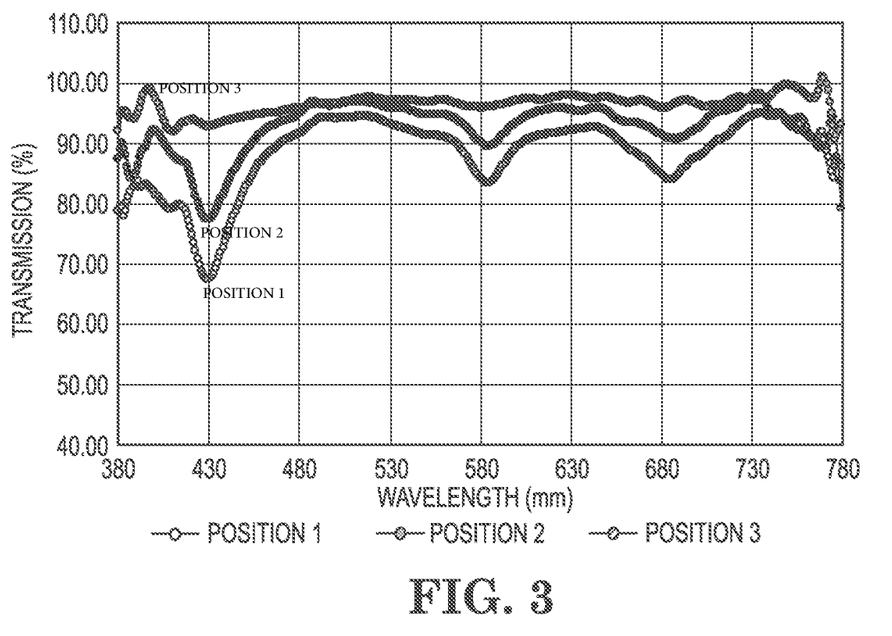
FIG. 3 are transmission spectra of different configurations of the embodiments shown in FIG. 2 with the blue-filtering layer in the different positions as indicated in FIG. 2.

FIG. 3 shows the effective transmittance of the light-conversion or absorbing material (blue-light filtering layer) across the visible spectrum as a function of where the light conversion material or light conversion material is placed within the display backlight. The effective transmittance is calculated by dividing the emission from the display with the light conversion material or light absorbing material by the emission of the display without the light conversion material or light absorbing material. The different spectra shown in FIG. 3 illustrate the impact of the light conversion or light absorbing material layer when placed at different locations (positions) in the display—outside of and within the backlight unit.

FIG. 3 are transmission spectra of different configurations of the embodiments shown in FIG. 2 with the light conversion or light absorbing material (blue-filtering) layer in the different positions as indicated in FIG. 2. They show the transmission spectra of a typical backlight display configuration (FIG. 2) with a layer of light conversion or light absorbing material positioned in three different places in the backlight filter. In POSITION 1, the light conversion or light absorbing material was between light-guide plate 202 and diffuser 216. In POSITION 2, the light conversion or light absorbing material was between first prismatic brightness enhancing film 213 and second prismatic brightness enhancing film 214. In POSITION 3, the light-conversion material or light absorbing layer was placed on top of the polarizer (between the backlight unit 200 and any liquid crystal imaging layers being illuminated by backlight unit 200). FIG. 1 is a schematic that shows a liquid crystal electronic imaging device on top of the backlight as disclosed above. When the light conversion or light absorbing material layer was positioned above the polarizer in POSITION 3 (top curve in FIG. 3) the transmission spectrum shows very little absorption and reemission of light from the light-conversion material layer. The spectral line for POSITION 3 is relatively flat with few absorptions from the light-conversion material layer.

When the same light-conversion or light absorbing material layer was placed in POSITION 2 between the first prismatic brightness enhancing layer and the second prismatic brightness enhancing layer, the effect of the light-conversion or light absorbing material layer is shown in the middle curve of FIG. 3. The transmission of light in the blue region of the spectrum (400 nm-500 nm) is decreased by about 16%. The light-conversion material layer also has color balancing (color correction) ingredients that also decrease the red region of the spectrum (650 nm-700 nm) and also in the yellow portion of the spectrum (550 nm-615 nm).

When the same light-conversion or light absorbing material layer was positioned between the light-guide plate and the diffuser layer as shown in POSITION 1 (bottom curve of FIG. 3), the absorption of the same film was enhanced and the transmission of light in the blue region of the spectrum (400 nm-500 nm) is decreased by about 28%. In a separate experiment, the transmittance of the light-conversion or light absorbing layer (400 nm-500 nm) was calculated by subtraction of the transmittance of the backlight display without the light-conversion layer. The results showed that it would take about 12 simulated layers of the film to produce the absorbance shown in FIG. 3 POSITION 1.

Figure 4:
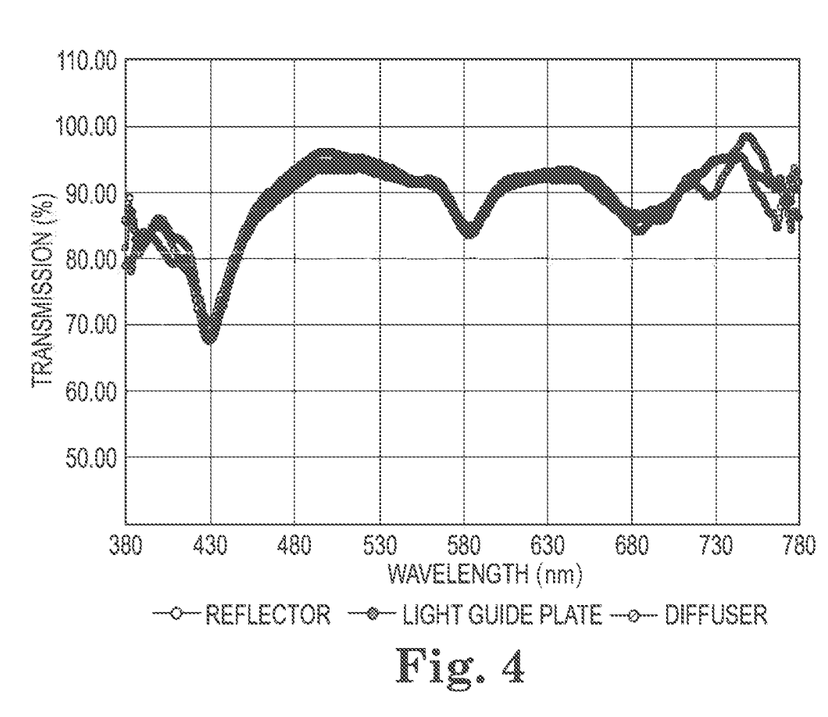
FIG. 4 are transmission spectra of embodiments of the backlight unit shown in FIG. 2 with the blue-filtering layer is in various positions below the diffuser.

FIG. 4 are transmission spectra of embodiments of the backlight unit shown in FIG. 2 with the light-conversion layer in various positions in the backlight below the diffuser. In FIG. 4, the light-conversion layer was coated on a poly(ethylene terephthalate) (PET) film which was placed on the reflector, on the light-guide plate, and on the diffuser layer. The results show that the light conversion or light absorbing layer produces absorption amplification if it is located anywhere below the prismatic brightness enhancing layers of the backlight. Although not wishing to be bound by theory, it is observed that when the light conversion or light absorbing layer is located within the backlight unit (below the prismatic brightness enhancing layer and polarizing layer) that absorption may be maximized due to the multiple internal reflections within the backlight unit.

FIG. 4 shows three effective transmission curves of three different configurations of a backlight stack as illustrated in FIG. 2. In FIG. 4, one curve is an absorption curve of the backlight unit shown if FIG. 2 with the light-conversion on PET layer positioned above the reflector and under the light-guide plate. A second absorption curve is a measurement of the spectrum of the same backlight unit with a light absorbing material on PET layer on top of the light-guide plate. The third absorption curve is the spectrum of the same backlight unit with the light-conversion on PET layer between the light-guide plate and the diffuser. It is the same as POSITION 1 on FIG. 2. All three curves lie essentially on top of one another showing that having the light absorbing material layer located in any position below the prismatic brightness enhancing film does not substantially change the absorption and that the absorption of the backlight unit for all three configurations show the substantially the same amount of amplification of absorption with respect to the light absorbing material on top of the backlight unit.

While embodiments of the invention have been illustrated and described, it will also be apparent that various modifications can be made without departing from the scope of the invention. It is also contemplated that various combinations or sub combinations of the specific features and aspects of the disclosed embodiments can be combined with or substituted for one another in order to form varying modes of the invention. Accordingly, it is not intended that the invention be limited, except as by the appended claims. All references cited within are herein incorporated by reference in their entirety.

What is claimed is:

1. A display system for use with electronic display devices comprising:
    an electronic display device; and
    a backlight unit, wherein the backlight unit comprises:
        a light-emitting array;
        a reflector adjacent to the light-emitting array;
        a diffuser opposite the reflector;
        a first brightness enhancing layer adjacent to the diffuser;
        an optical film having at least one light conversion material or at least one light absorbing material that is solubly or insolubly dispersed throughout the optical film;
        a light-guide plate having an edge, a bottom face, and a top face;
        a second brightness enhancing layer adjacent to the first brightness enhancing layer; and
        a polarizing filter adjacent to the second brightness enhancing layer,
    wherein
        the at least one light conversion material or at least one light absorbing material is structured and configured to reduce transmission of hazardous blue light in the wavelength range between about 400 nm and about 500 nm,
        the light-emitting array is structured and configured to inject light into the light-guide plate, and
        the reflector is adjacent to the bottom face of the light-guide plate, opposite the diffuser.

2. A display system according to claim 1, wherein the electronic display devices are selected from an LCD monitor, an LCD-TV monitor, a handheld device, a table, and a laptop display.

3. A display system according to claim 1, wherein the display system comprises a liquid crystal panel and illumination assembly positioned to provide illumination light to the liquid crystal panel.

4. A display system according to claim 3, further comprising panel plates wherein the liquid crystal panel is disposed between the panel plates.

5. A display system according to claim 4, wherein the panel plates comprise electrode structures and alignment layers structured and configured to control the orientation of liquid crystals in the liquid crystal panel.

6. A display system according to claim 5, further comprising a color filter structured and configured to impose color on an image displayed by the liquid crystal panel.

7. A display system according to claim 1, wherein the light conversion materials or light absorbing materials comprise nanoparticles.

8. A display system according to claim 1, wherein the light conversion materials or light absorbing materials comprise organic materials.

9. A display system according to claim 1, wherein the optical film in the backlight unit comprises index matched light conversion materials or light absorbing materials.

10. A display system according to claim 1, wherein the optical film in the backlight unit comprises light conversion materials or light absorbing materials that have index differences from the optical film and are useful for diffusers or reflectors.

11. A display system according to claim 1, comprising inorganic nanoparticles that are index matched to the optical film in the backlight unit and coupled to an organic adhesive applied to the optical film.

12. A display system according to claim 1, wherein the optical film is included on the diffuser.

13. A display system according to claim 1, wherein the optical film is the diffuser and the light conversion materials or light absorbing materials are solubly or insolubly dispersed throughout the diffuser.

14. A display system according to claim 13, wherein the light conversion materials or light absorbing materials are index matched.

15. A display system according to claim 13, wherein the light conversion materials or light absorbing materials have index differences.

16. A display system according to claim 1, comprising inorganic nanoparticles that are index matched to the light conversion materials or light absorbing materials and coupled to an organic adhesive applied to the optical film in the backlight unit.

17. A method of enhancing blue light absorption (400 nm-500 nm) in a backlight unit comprising providing a display system for use with electronic display devices comprising:
    an electronic display device; and
    a backlight unit, wherein the backlight unit comprises:
        a light-emitting array;
        a reflector adjacent to the light-emitting array;
        a diffuser opposite the reflector;
        a first brightness enhancing layer adjacent to the diffuser;
        an optical film having at least one light conversion material or at least one light absorbing material that is solubly or insolubly dispersed throughout the optical film;
        a light-guide plate having an edge, a bottom face, and a top face;

a second brightness enhancing layer adjacent to the first brightness enhancing layer; and a polarizing filter adjacent to the second brightness enhancing layer, wherein the at least one light conversion material or at least one light absorbing material is structured and configured to reduce transmission of hazardous blue light in the wavelength range between about 400 nm and about 500 nm, the light-emitting array is structured and configured to inject light into the light-guide plate, and the reflector is adjacent to the bottom face of the light-guide plate, opposite the diffuser.

18. A method of enhancing blue light absorption (400 nm-500 nm) in a backlight unit according to claim 17, further comprising inserting the optical film between the first brightness enhancing layer and the second brightness enhancing layer.

19. A method of enhancing blue light absorption (400 nm-500 nm) in a backlight unit according to claim 17, further comprising inserting the optical film between the reflector and the bottom face of the light-guide plate.

20. A method of enhancing blue light absorption (400 nm-500 nm) in a backlight unit according to claim 17, further comprising inserting the film between the top face of the light-guide plate and the diffuser.

21. A method of enhancing blue light absorption (400 nm-500 nm) in a backlight unit according to claim 17, further comprising inserting the optical film on at least one of the reflector, diffuser, or brightness enhancing layer.

22. A method of enhancing blue light absorption (400 nm-500 nm) in a backlight unit according to claim 17, wherein the optical film is at least one of the first brightness enhancing layer and the second brightness enhancing layer, and the at least one light conversion material or at least one light absorbing material is dispersed throughout the at least one of the first brightness enhancing layer and the second brightness enhancing layer.

23. A method of enhancing blue light absorption (400 nm-500 nm) in a backlight unit according to claim 17, wherein the optical film is at least one of the reflector and the bottom face of the light-guide plate, and the at least one light conversion material or at least one light absorbing material is dispersed throughout the at least one of the reflector and the bottom face of the light-guide plate.

24. A method of enhancing blue light absorption (400 nm-500 nm) in a backlight unit according to claim 17, wherein the optical film is at least one of the reflector, diffuser, or brightness enhancing layer and the at least one light conversion material or at least one light absorbing material is dispersed throughout the at least one of the reflector, diffuser, and brightness enhancing layer.

* * * * *